3,095,441
AZAPENTADIENENITRILES
Robert M. Kliss, Marblehead, Mass., assignor to Monsanto Research Corporation, St. Louis, Mo., a corporation of Delaware
No Drawing. Filed May 17, 1962, Ser. No. 195,426
3 Claims. (Cl. 260—465.5)

This invention relates to new compounds, and more particularly, provides novel azapentadienenitriles.

By aza is meant nitrogen substituted for carbon in a carbon atom chain. Thus an azapentadienenitrile has the skeletal structure $$C=C-N=C-C\equiv N$$

This is the structure of an N-substituted imine or Schiff's base. Schiff's bases are ordinarily formed by condensing an aldehyde with an amine, as illustrated by the schematic equation $$RCHO + H_2NR' \rightarrow RCH=NR' (+H_2O)$$

where R and R' are organic radicals. The above-stated structure, however, is not included among imines available by such a reaction. The amine required is vinyl amine, which is unstable. The cyanoformaldehyde reactant which would be required is equally unavailable. Thus, this kind of structure has not received attention hitherto, although the stated aza diene could be predicted to be stable, because of the conjugation of the unsaturation, and this type of compound wil have useful biological properties.

It is an object of this invention to provide novel compounds.

A particular object of this invention is to provide novel 3-azapentadienenitriles.

These and other objects will become evident from a consideration of the following specification and claims.

The novel products provided by this invention are 3-azapentadienenitriles, of the formula

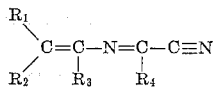

where each of $R_1$, $R_2$, $R_3$ and $R_4$ is selected separately from the class consisting of H and halogen. The halogens which may be present in the compounds of this invention are fluorine, chlorine, bromine and iodine.

It has been found that compounds of the stated nature are formed by dehalogenating a haloacetonitrile with a metal. Compounds formed concurrently in this reaction suggest that the reaction involves abstraction of halogen from the nitrile, leaving a free radical which can add to itself and rearrange. Thus upon consideration of the structure of the presently provided compounds, as shown in the above formula, it can be seen that they are made up of a series of two CCN groups. In any case, however, infrared spectra and other analytical techniques identify the product as having the stated structure, of a 3-aza-2,4-pentadienenitrile.

Illustrative of the compounds provided by the invention are, for example, perhalogenated products such as 3-aza - 2,4,5,5 - tetrachloropentadienenitrile, 3 - aza - 2,4,5,5 - tetrabromopentadienenitrile, 3 - aza - 2,4,5,5 - tetrafluoropentadienenitrile, 3-aza-2,4,5,5-tetraiodopentadienenitrile, 3-aza-4,5-dichloro-2,5-difluoropentadienenitrile, 3-aza - 2,5 - dichloro - 4,5 - difluoropentadienenitrile and the like; partly halogenated products such as 3-aza-2,5 - dichloropentadienenitrile, 3 - aza - 4,5 -dichloropentadienenitrile, 3-aza-5,5-dichloropentadienenitrile, 3-aza - 2,4 - dichloropentadienenitrile, 3 - aza - 2,5 - difluoropentadienenitrile, 3 - aza - 4,5 - difluoropentadienenitrile, 3 - aza - 5,5 - difluoropentadienenitrile, 3-aza - 2,4 - difluoropentadienenitrile, 3 - aza - 4,5 - dibromopentadienenitrile, 3 - aza - 2,5 - diiodopentadienenitrile, 3 - aza - 2 - chloro - 4 - fluoropentadienenitrile, 3 - aza - 2 - chloro - 5 - fluoropentadienenitrile, 3-aza - 4 - chloro - 5 - fluoropentadienenitrile, 3 - aza-2,5-dibromopentadienenitrile and the like; and the parent, non-halogenated compound, 3-aza-2,4-pentadienenitrile. The halogenated materials are preferred, and especially the perhalogenated materials, which have particularly potent biological toxicant properties.

The products of the invention are obtained by dehalogenating a haloacetonitrile with a metal. Useful haloacetonitriles include those haloacetonitriles in which one halogen atom is removable by the metal reactant, and a second substituent is capable of migration, such as, for example, trichloroacetonitrile, tribromoacetonitrile, dichlorofluoroacetonitrile, dichloroacetonitrile, dibromoacetonitrile, diiodofluoroacetonitrile, diiodoacetonitrile, dibromofluoroacetonitrile and the like. The products will have an empirical formula corresponding that of the dimer of the initial haloacetonitrile minus one atom of halogen. Thus for example, where the initial haloacetonitrile is tribromoacetonitrile, this will provide 3-aza-2,4,5,5-tetrabromo-2,4-pentadienenitrile. Where the initial starting material is dichloroacetonitrile, this will provide an azadichloropentadienenitrile, and so forth.

The method to be employed in preparing the compounds of this invention is described in more detail in copending application SN 195,437 filed concurrently herewith by Robert J. Wineman, Clifford M. Matthews and Robert M. Kliss. In accordance with this method, a haloacetonitrile is contacted with a metal having a single electron in its outer orbit and an even number of electrons in the next inner orbit, said metal being one capable of forming a stable monovalent halide. The metals of this description include sodium, potassium, cesium, rubidium, copper and silver. The ratio of metal to haloacetonitrile may vary. Using the stoichiometric ratio, which is 1 gram atom of metal per mole of haloacetonitrile, has been found quite effective, but if desired the provided novel compounds may be formed using down to ½ or ⅓ gram atom of the metal per mole of the haloacetonitrile, or on the other hand, the compounds may also be formed employing excess metal in an amount providing for example, 2 to 3 times the equivalent ratio.

In conducting the dehalogenation of the haloacetonitrile with a metal, the composition of the reaction mixture has been found to affect the nature of the reaction product significantly. Thus when the haloacetonitrile is reacted with the metal in the absence of solvent, the products of the reaction include the presently provided olefinic nitriles. When the haloacetonitrile and the metal are heated together in an inert hydrocarbon non-polar solvent, surprisingly it is found that no reaction occurs in any reasonable time. When the haloacetonitrile and the metal are heated together in a complexing solvent, where the structure of the solvent molecule includes an unshared pair of electrons on one atom, such as an oxygenated solvent, reaction is obtained, but if reaction times as long as those employed in conducting the reaction in the absence of solvent are used, the olefinic nitriles provided by the invention are essentially absent from the reaction mixture. Therefore, the preferred method of dehalogenating the haloacetonitrile with a metal to form the compounds of this invention comprises either dehalogenating the haloacetonitrile with a metal in the essential absence of a solvent, or contacting a haloacetonitrile with a metal in a complexing solvent, for short reaction times, sufficient to effect reaction. Illustrative of complexing solvents which will be employed in the latter connection are for example the dimethyl ether of diethylene glycol, dimethylformamide, dimethylsulfoxide, tetrahydrofuran, diethyl ether, dioxane, thiophene, pyridine, ammonia and the like. But the preferred embodiment of the presently considered method of forming the presently provided azapentadiene nitriles consists in contacting the haloacetonitrile with the metal essentially in the absence of other reaction mixture components.

A wide range of temperatures, from below room temperature up to any temperature which is less than the decomposition temperature of the reaction mixture components, may be employed in conducting the reaction. With an active metal like copper and the presently preferred haloacetonitriles wherein the aliphatic carbon substituents are selected solely from hydrogen and halogen, the temperatures employed will generally range from about 50° C. to about 100° C., and still more preferably may be about 75–85° C. Short contact times at high temperatures will optimize production of the present products, but the reaction time, especially at lower temperatures, may extend to 48 hours or more. Once formed, the present compounds are quite stable.

The foregoing refers to atmospheric pressure. Usually variation from atmospheric pressure is unnecessary, but the pressure if desired may be varied from subatmospheric ranging down to say about 50 mm. Hg, to superatmospheric, up to pressure such as about 5000 p.s.i.

Upon completion of the reaction, the presently provided products will be separated by the usual isolation techniques such as fractionation and distillation. As set forth in the above-identified copending application in which the presently stated method is disclosed and claimed, the compounds provided by the present invention will generally be found to be admixed with olefinic and possibly saturated dinitriles, including succinonitriles, maleonitriles and fumaronitriles, and the reaction mixture will also include polymeric material. The presently provided compounds are separable by insolation procedures such as distillation from other components in the reaction mixture. The products of the present invention can be identified by special analysis, in which they ehibit absorption corresponding to olefinic carbon-to-carbon unsaturation and also carbon to nitrogen imino unsaturation, plus absorption corresponding to conjugated nitrile.

The products of this invention are novel materials possessing valuable properties. Though relatively high-boiling, they have a high vapor pressure. Presently provided halogenated compounds are strong lachrymators. Thus they may be employed as biological toxicants, for the repression and kill of undesired organisms including for example, insects, nematodes, bacteria, fungi and the like, or even larger mammalian organisms, as well as undesired vegetation such as weeds. The present compounds and also the halogenated derivatives have sequestering properties and they and polymers thereof may be used to remove undesired metallic ions from solution and so forth. They may be employed as antioxidants, and in this connection an indicator effect may be obtained via changes from the initial colors of these materials.

The invention is illustrated but not limited by the following examples, in which all parts are by weight unless otherwise noted.

*Example 1*

This example illustrates preparation of 3-aza-2,4,5,5-tetrachloro-2,4-pentadienenitrile.

A mixture of 102 parts (0.7 mole) of freshly distilled trichloroacetonitrile and 44 parts (0.7 gram atoms) of finely divided copper powder is stirred under nitrogen at 70° C. for 18 hours. The resulting brown-black reaction mixture is filtered and the filtrate is combined with ether washes of the separated solids. Upon distillation, after unreacted trichloroacetonitrile and some higher boiling or subliming material has been taken off, a yellow liquid is distilled over at 54° C./4.5 mm. with a refractive index of $n_D^{24.8}$ 1.5946. This yellow liquid has infrared spectrum bands at $4.46\mu$ and $4.50\mu$ corresponding to CN, at $6.0$–$6.55\mu$, corresponding to C:C unsaturation and C:N unsaturation, and at $8.5$–$15.5\mu$ (chlorine bonded to carbon). Its ultraviolet spectrum has a maximum at 330 m$\mu$. Elemental analysis also corresponds to the structure stated above:

($C_2Cl_2N$) requires: C, 22%; H, 0%; N, 12.8%; Cl, 65.1%. Found: C, 22%; H, 0%; N, 13.2%; Cl, 64.8%.

*Example 2*

This example illustrates preparation of a dibromoazapentadienenitrile.

A mixture of 405 parts of dibromoacetonitrile (0.2 mole) and 128 parts of copper powder (0.2 gram atoms) is stirred under nitrogen. No heat is supplied, but an exotherm is observed. After 3 hours the mixture is completely solidified and black. Extraction of the solid residue with ether separates organic material from which unreacted starting material can be separated by distillation. The distillation residue is composed of unreacted starting material mixed with a white solid which can be separated by vapor phase chromatography. The infrared spectrum of the white solid includes absorption of CH groups at $3.3\mu$, nitrile absorption at $4.45\mu$ and $4.48\mu$, mixed unsaturation similar to that of the product of Example 1 at between 5.50 and $6.25\mu$, together with absorption at longer wave lengths which corresponds to bromine substituted on carbon.

Treatment of dichloroacetonitrile and dibromofluoroacetonitrile with copper produces similar results.

While the invention has been illustrated with reference to various specific preferred embodiments thereof, it is to be appreciated that modifications and variations are possible within the scope of the invention, which is limited only as defined in the appended claims.

What is claimed is:
1. 3-aza-2,4-pentadienenitriles of the formula

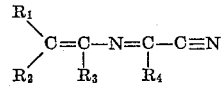

where each of $R_1$, $R_2$, $R_3$ and $R_4$ is selected separately from the class consisting of hydrogen and halogen.
2. Perhalogenated azapentadienenitriles.
3. 3-aza-2,4,5,5-tetrachloro-2,4-pentadienenitrile.

No references cited.